_United States Patent_ [19]

Horikawa

[11] Patent Number: 4,847,499
[45] Date of Patent: Jul. 11, 1989

[54] RADIATION IMAGE RECORDING AND READ-OUT APPARATUS

[75] Inventor: Kazuo Horikawa, Kanagawa, Japan

[73] Assignee: Fuji Photo Film Co., Ltd., Kanagawa, Japan

[21] Appl. No.: 143,919

[22] Filed: Jan. 14, 1988

[30] Foreign Application Priority Data

Jan. 14, 1987 [JP] Japan .................................. 62-7332
Jan. 8, 1988 [JP] Japan .................................. 63-2015

[51] Int. Cl.$^4$ ........................................... G01N 23/04
[52] U.S. Cl. .................................................. 250/327.2
[58] Field of Search ........................... 250/327.2, 484.1

[56] References Cited

U.S. PATENT DOCUMENTS 4,258,264 3/1981 Kotera et al. ..................... 250/327.2
4,400,619 8/1983 Kotera et al. ..................... 250/327.2
4,543,479 9/1985 Kato ................................ 250/327.2

FOREIGN PATENT DOCUMENTS 181446 5/1986 European Pat. Off. .
209119 1/1987 European Pat. Off. .
11395 4/1981 Japan .

Primary Examiner—Carolyn E. Fields
Attorney, Agent, or Firm—Sughrue, Mion, Zinn, Macpeak & Seas

[57] ABSTRACT

A radiation image recording and read-out apparatus comprises an endless recording belt provided with a stimulable phosphor layer; a group of rollers, around which the recording belt is applied, including two roller sections spaced by a predetermined distance from each other, for circulating the recording belt around them between the two roller sections along the direction of the predetermined distance; an image recording section for exposing the stimulable phosphor layer to a radiation; an image read-out section for scanning the stimulable phosphor layer carrying a radiation image stored thereon by stimulating rays; and an erasing section. The predetermined distance between the roller sections is 1–1.5 times as long as the length of the maximum single image area of the radiation image recordable at the image recording section. The image recording section faces the recording belt moving between the roller sections. The image read-out section carries out scanning by stimulating rays for the stimulable phosphor layer present on a circumferential surface of a roller in the group of rollers.

2 Claims, 8 Drawing Sheets

4,847,499

RADIATION IMAGE RECORDING AND READ-OUT APPARATUS

BACKGROUND OF THE INVENTION

1. Field of the Invention

This invention relates to a radiation image recording and read-out apparatus for recording a radiation image on a stimulable phosphor, exposing the stimulable phosphor to stimulating rays which cause the stimulable phosphor to emit light in proportion to the stored radiation energy, detecting the emitted light to read out the radiation image, and converting the emitted light into electric signals. This invention particularly relates to a radiation image recording and read-out apparatus which is small as a whole.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a recording material provided with a layer of the stimulable phosphor is first exposed to a radiation passing through an object such as the human body to have a radiation image of the object stored thereon, and is then two-dimensionally scanned by stimulating rays such as a laser beam which cause the recording material to emit light in proportion to the stored radiation energy. The light emitted by the recording material upon stimulation thereof is photoelectrically detected and converted to electric image signals by a photodetector, and the radiation image of the object is reproduced as a visible image by use of the image signals on a recording medium such as a photographic film, a display device such as a cathode ray tube (CRT), or the like.

The radiation image recording and reproducing system using a recording material provided with a stimulable phosphor is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a wide range in proportion to the amount of said stored energy, it is possible to obtain an image having desirable density regardless of the amount of exposure to the radiation of the recording material provided with the stimulable phosphor, by reading out the emitted light with an appropriate read-out gain and converting it into electric signals to reproduce a visible image on a recording medium or a display device.

In the aforesaid radiation image recording and reproducing system, the recording material provided with the stimulable phosphor is used to temporarily store the radiation image in order to reproduce the final visible image therefrom on a final recording medium. For economical reasons, therefore, it is desirable that the recording material provided with the stimulable phosphor be used repeatedly.

Accordingly, the applicant has proposed, for example U.S. Pat. No. 4,543,479, a radiation image recording and read-out apparatus which enables the stimulable phosphor to be efficiently circulated and reused.

The proposed radiation image recording and read-out apparatus comprises, in a single apparatus:

(a) a supporting material, (b) at least one recording material fixed on said supporting material and comprised of a stimulable phosphor layer capable of storing a radiation image, (c) an image recording section for exposing said recording material to a radiation passing through an object to have a radiation image of the object stored on said recording material, (d) an image read-out section provided with a stimulating ray source for emitting stimulating rays for scanning said recording material carrying said radiation image stored thereon, and a photoelectric read-out means for obtaining electric image signals by reading out light emitted by said recording material scanned and stimulated with the stimulating rays, (e) a means for circulating said recording material on said supporting material with respect to said image read-out section for enabling reuse of said recording material by repeatedly moving said supporting material and said image read-out section with respect to each other, and (f) an erasing section for eliminating radiation energy remaining on said recording material prior to image recording on said recording material after the radiation image is read out therefrom at said image read-out section, whereby the recording material is efficiently circulated and reused.

In the proposed radiation image recording and read-out apparatus, it is very advantageous that a material comprising an endless supporting belt and a plurality of stimulable phosphor layers overlaid on the endless supporting belt be used as the recording material. In this case, the recording material can be applied around rollers or the like and conveyed and circulated sequentially through the image recording section, the image read-out section and the erasing section. An example of such a configuration is shown in FIG. 10.

With reference to FIG. 10, three stimulable phosphor sheets 102 are fixed on an endless conveyor 101. The conveyor 101 is provided around rollers 103 and 104, and moved in the direction indicated by the arrow by rotation of the rollers 103 and 104. Around the conveyor 101, an image recording section 110, an image read-out section 120 and an erasing section 130 are disposed sequentially in the direction of conveyance by the conveyor 101.

The image recording section 110 is provided with a radiation source 111 which may be an X-ray source or the like, and stores a radiation image of an object 112 on the stimulable phosphor sheet 102 facing the radiation source 111 with the object 112 interposed. The stimulable phosphor sheet 102 carrying the radiation image thus stored thereon is then sent to the image read-out section 120. The image read-out section 120 is provided with a stimulating ray source 122 for emitting stimulating rays 121A such as a laser beam, a light deflector 122 constituted by a galvanometer mirror or the like for deflecting in the width direction of the conveyor 101 the stimulating rays 121A emitted by the stimulating ray source 121, and a photodetector 123 for reading out light 125 emitted by the stimulable phosphor sheet 102 upon stimulation thereof by the stimulating rays 121A. The photodetector 123 may be constituted by a head-on type photomultiplier, a photoelectric amplification channel plate or the like. The photodetector 123 photoelectrically detects the light 125 emitted by the stimulable phosphor sheet 102 upon stimulation thereof and guided by a light guide member 124. When the stimulable phosphor sheet 102 on which the image has been recorded has been sent to the image read-out section 120, the stimulable phosphor sheet 102 or the scanning system for the stimulating rays 121A and the system for detecting the light 125 emitted by the stimulable phosphor sheet 102 are moved normal to the direction of the scanning of the stimulating rays 121A, so that the overall surface of the stimulable phosphor sheet 102 is exposed to the stimulating rays 121A and image read-out is carried out over the overall surface of the stimulable phosphor sheet 102. After the image read-out from the stimulable phosphor sheet 102 is finished, the stimulable phosphor sheet 102 is sent to the erasing section 130 which is provided with an erasing light source 131. The erasing light source 131 irradiates light having a wavelength within the stimulation wavelength range of the stimulable phosphor sheet 102 onto the stimulable phosphor sheet 102 to cause it to release the radiation energy remaining thereon. The erasing light source 131 may be constituted by, e.g., a tungsten-filament lamp, a halogen lamp, an infrared lamp, or a laser light source as disclosed in U.S. Pat. No. 4,400,619. The stimulable phosphor sheet 102 erased at the erasing section 130 is again sent to the image recording section 110. In the course of the movement of the stimulable phosphor sheet 102 to the erasing section 130, the stimulable phosphor sheet 102 is cleaned by a cleaning roller 105, removing dust from the sheet surface.

However, with the radiation image recording and read-out apparatus as shown in FIG. 10 wherein the image recording section and the image read-out section are disposed to face the same surface (the upper surface) of the conveyor, the length of the overall apparatus in the horizontal direction is several times the length of a stimulable phosphor sheet corresponding to a single image area of the radiation image, and therefore the apparatus as a whole becomes very large. As is well known, the aforesaid radiation image recording and reproducing system is used very advantageously for medical diagnosis. However, in the case where the recording and reproducing apparatus comprising the recording and read-out apparatus is large, the apparatus can be installed only centrally in a comparatively large-scale hospital, and it is not always possible to install it in each medical examination room of a comparatively small-scale hospital. Also, with the aforesaid recording and read-out apparatus wherein the scanning position of stimulating rays is on the conveyor moving between the two rollers, the scanning position readily becomes unstable, for example it swings as the conveyor is moved, and the accuracy of scanning by stimulating rays is often deteriorated.

SUMMARY OF THE INVENTION

The primary object of the present invention is to provide a radiation image recording and read-out apparatus which is markedly smaller than the conventional radiation image recording and read-out apparatus.

Another object of the present invention is to provide a radiation image recording and read-out apparatus wherein scanning by stimulating rays is carried out accurately.

The present invention provides a radiation image recording and read-out apparatus comprising:
(i) a recording belt composed of an endless belt provided with a stimulable phosphor layer,
(ii) a group of rollers, around which said recording belt is applied, including two sets of roller sections spaced apart from each other by a predetermined distance, for conveying and circulating said recording belt between said two sets of roller sections along the direction of said predetermined distance,
(iii) an image recording section for exposing said stimulable phosphor layer to a radiation passing through an object to have a radiation image of the object stored on said stimulable phosphor layer,
(iv) an image read-out section provided with a stimulating ray source for emitting stimulating rays for scanning said stimulable phosphor layer carrying said radiation image stored thereon, and a photoelectric read-out means for obtaining electric image signals by reading out light emitted by said stimulable phosphor layer in proportion to the stored radiation energy when said stimulable phosphor layer is scanned and stimulated with the stimulating rays, and
(v) an erasing section for eliminating radiation energy remaining on said stimulable phosphor layer prior to image recording on said stimulable phosphor layer after the radiation image is read out therefrom at said image read-out section,
wherein the improvement comprises:
(a) adjusting said predetermined distance between said two sets of the roller sections to 1-1.5 times as long as the length of the maximum single image area of the radiation image which can be recorded at said image recording section,
(b) providing said image recording section to face said recording belt moving between said two sets of the roller sections, and
(c) providing said image read-out section to carry out scanning by said stimulating rays for said stimulable phosphor layer present on a circumferential surface of a roller in said group of rollers.

The stimulable phosphor layer may be formed over the overall surface of the endless belt. Alternatively, one or a plurality of stimulable phosphor layers each having a length equal to or slightly longer than the length of the maximum single image area may be formed on the endless belt. Also, the group of rollers may be composed of the above-mentioned two sets of roller sections alone or include other rollers in addition thereto as long as they can convey the recording belt along the distance between the two sets of roller sections without projecting it outward. Each of the roller sections is composed of a single roller or a plurality of rollers. By the term "distance between roller sections" as used herein is meant the length between the most distant edges of the roller sections.

With the radiation image recording and read-out apparatus in accordance with the present invention wherein the stimulable phosphor layer is formed on the recording belt, the distance between the two roller sections in the group of rollers for conveying and circulating the recording belt is adjusted to 1–1.5 times as long as the length of the maximum single image area, the width of the overall apparatus can be decreased to approximate the length of the maximum single image area at the smallest, while the recording belt can be disposed at the image recording position with room without substantially increasing the size of the apparatus. The apparatus as a whole can be made small by decreasing the length of the apparatus in one direction to a value much smaller than the conventional one. Therefore, the radiation image recording and read-out apparatus in accordance with the present invention can readily be installed in small-scale medical facilities where a conventional recording and read-out apparatus of this type could not easily be installed, and thus the range of utilization of the apparatus can be expanded. Also, with the radiation image recording and read-out apparatus in accordance with the present invention wherein scanning by stimulating rays is carried out on the circumferential surface of the roller where movement of the recording belt is stablest, the scanning for image read-out can be carried out accurately and reliably.

DESCRIPTION OF THE PREFERRED EMBODIMENTS

The present invention will hereinbelow be described in further detail with reference to the accompanying drawings.

Figure 1:
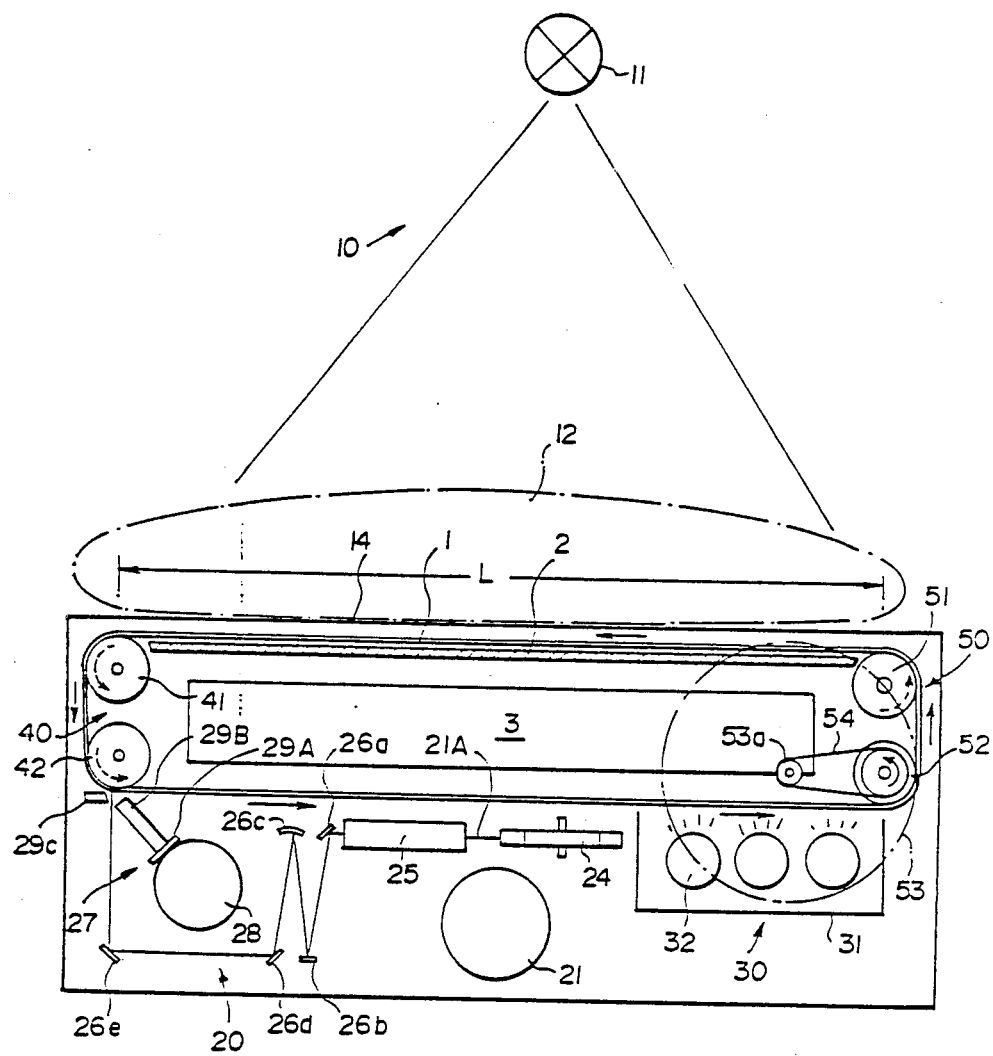
FIG. 1 is a side view showing an embodiment of the radiation image recording and read-out apparatus in accordance with the present invention.
Figure 2:
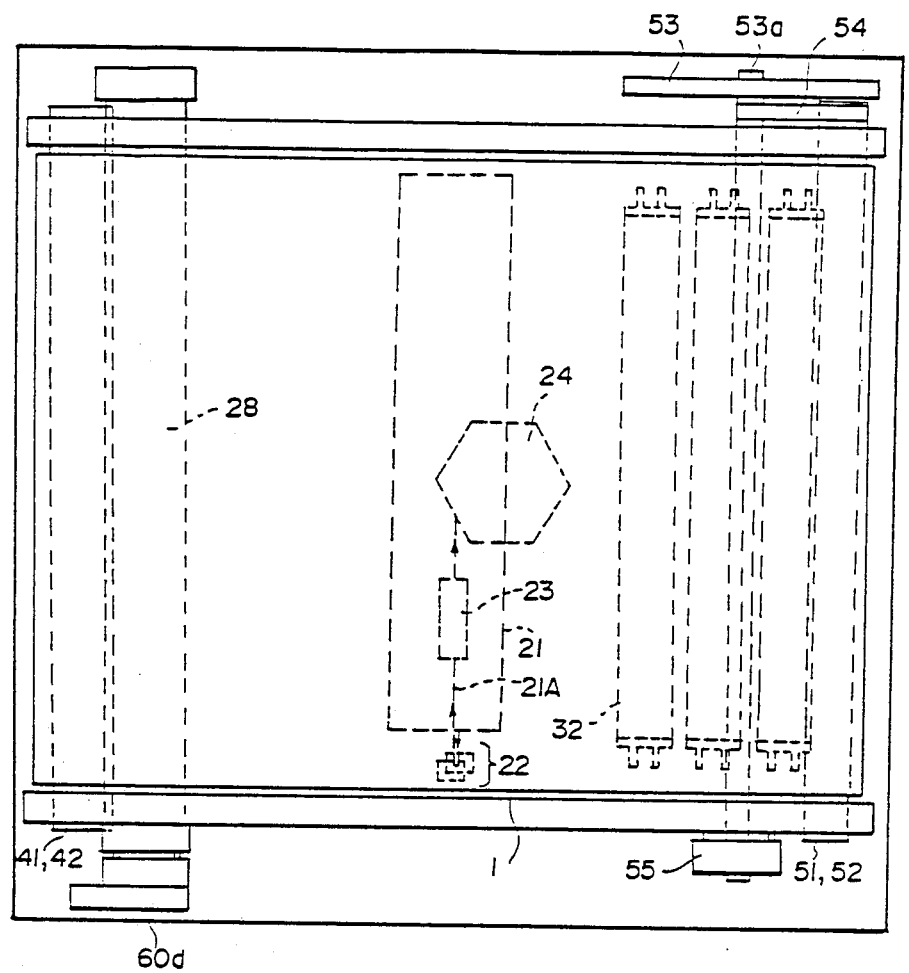
FIG. 2 is a plan view showing the major part of the embodiment shown in FIG. 1.

With reference to FIGS. 1 and 2, a recording belt 1 composed of an endless belt on which a stimulable phosphor layer is formed over the overall surface is applied around a first roller section 40 constituted by rollers 41 and 42, and a second roller section 50 constituted by rollers 51 and 52 and spaced by a predetermined distance L from the first roller section 40. The recording belt 1 is conveyed and circulated in the direction indicated by the arrow around the first roller section 40 and the second roller section 50. In this embodiment, the group of roller are composed of these first and second roller sections 40 and 50 alone. A radiation source 11 constituted by an X-ray source or the like is disposed above and facing the recording belt 1. An upper region of the apparatus including the radiation source 11 and an image recording table 14 on which an object 12 is to be placed constitutes an image recording section 10.

At the image recording section 10, the radiation source 11 is activated to produce a radiation which passes through the object 12 placed on the image recording table 14, and a radiation image of the object 12 is projected onto the recording belt 1. In this manner, a radiation image of the object 12 is stored on the stimulable phosphor layer of the recording belt 1. The distance L between the first roller section 40 and the second roller section 50 is adjusted to be approximately equal to the length of a single image formed by the image recording. Therefore, the aforesaid radiation image is stored over the overall upper portion of the recording belt 1 by a single image recording step. The above-mentioned single image refers to the image of the maximum size among various image sizes which can be recorded in the apparatus. When recording of a smaller size is effected, the image is recorded on a proper part in the upper portion of the recording belt.

As long as the image recording is being carried out, the recording belt 1 is maintained stationary at a predetermined position so that the portion of the recording belt 1 on which the image recording is being carried out faces the radiation source 11. When the image recording is finished, the recording belt 1 is conveyed by the rollers 41, 42, 51 and 52 being rotated in the directions indicated by the arrows, and the portion of the recording belt 1 on which the image has been recorded is conveyed to an image read-out section 20 disposed on the left side below the recording belt 1. Of the rollers 41, 42, 51 and 52, the roller 52 is a drive roller connected with a shaft 53a of a motor 53 by a belt or a chain 54, and the other rollers 41, 42 and 51 are driven rollers which are rotated by the rotation of the drive roller 52. As shown in FIG. 2, a rotary encoder 55 is secured to the shaft 53a of the motor 53 for detecting the rotation of the motor 53 and carrying out various control items.

At the image read-out section 20, a stimulating ray source 21 constituted by a He-Ne laser or the like for producing stimulating rays 21A extends normal to the direction of conveyance of the recording belt 1. Also, a rotating polygon mirror 24 as a light deflector for scanning the stimulating rays 21A on the recording belt 1 in the width direction of the recording belt 1, i.e. in the main scanning direction at an angle normal to the drawing sheet in FIG. 1, is provided in the optical path of the stimulating rays 21A. As shown in FIG. 2, the optical path of the stimulating rays 21A produced by the stimulating ray source 21 is changed by a mirror group 22, and the stimulating rays 21A pass through a light input optical system 23 provided with a beam expander, a cylindrical lens or the like, and impinge upon the rotating polygon mirror 24. As shown in FIG. 1, the stimulating rays 21A reflected and deflected by the rotating polygon mirror 24 pass through a scanning optical system 25 composed of an fθ lens or the like, the optical path of the stimulating rays 21A is changed by mirrors 26a, 26b, 26c, 26d and 26e, and then the stimulating rays 21A repeatedly scan the recording belt 1 on the lower circumferential surface of the roller 42 in the main scanning direction. The mirror 26c is a cylindrical mirror for converging the stimulating rays 21A only in a plane parallel to the drawing sheet in FIG. 1. In the aforesaid optical system, the mirror 26c and the cylindrical lens in the aforesaid light input optical system 23 prevent pitch nonuniformity of scanning lines from arising on the recording belt 1 even should axis deviation, mirror surface inclination or the like arise with the rotating polygon mirror 24. Simultaneously wit the main scanning by the stimulating rays 21A, the recording belt 1 is conveyed at a predetermined speed by the rollers 41, 42, 51 and 52 in the sub-scanning direction as indicated by the arrow in FIG. 1. Accordingly, the stimulating rays 21A are irradiated to nearly the overall surface of the recording belt portion carrying the radiation image stored thereon at the image recording section 10.

Figure 3:
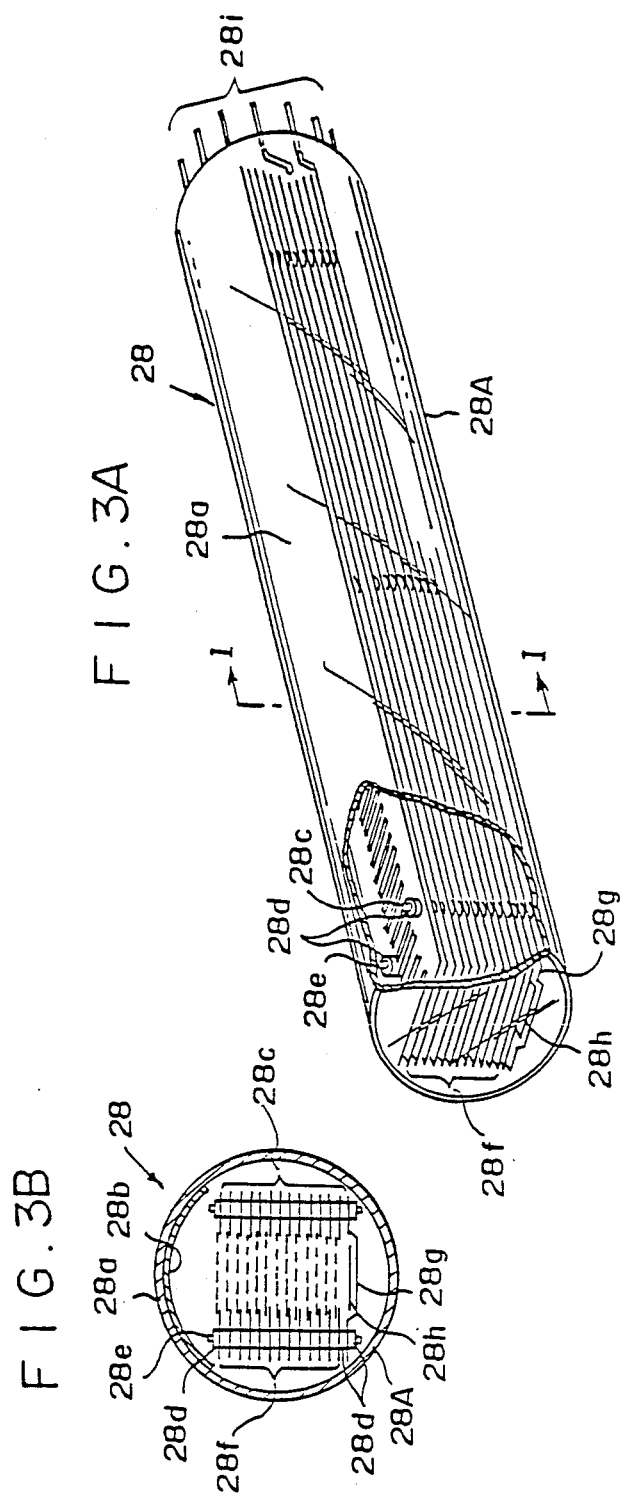
FIG. 3A is a perspective view showing a venetian blind type photomultiplier.
FIG. 3B is a sectional view taken along line I—I of FIG. 3A.

As the recording belt 1 is exposed to the stimulating rays 21A, the exposed part of the recording belt 1 emits light in proportion to the stored radiation energy, and the emitted light is detected by a photoelectric read-out means 27. In this embodiment, the photoelectric read-out means 27 comprises a long photomultiplier 28 extending in the main scanning direction at least over the length of the main scanning line, a filter 29A closely contacted with the light receiving face of the photomultiplier 28 for selectively transmitting only the light emitted by the recording belt 1 and preventing entry of the stimulating rays 21A reflected by the surface of the recording belt 1 to the photomultiplier 28, and a light guide member 29B closely contacted with the light input face of the photomultiplier 28 via the filter 29A for substantially guiding the light emitted by the recording belt 1 to the photomultiplier 28. By way of example, as shown in FIGS. 3A and 3B, the photomultiplier 28 has an electrode configuration generally called the venetian blind type. Also, a mirror 29C is disposed to face the photoelectric read-out means 27 via the scanning line for efficiently reflecting the light, which is emitted by the recording belt 1 toward the mirror 29C, to the light receiving face of the light guide member 29B. With reference to FIGS. 3A and 3B, the photomultiplier 28 comprises a cylindrical body 28A, a photocathode 28b disposed along the inner surface of the body 28A to face a light receiving face 28a, and a multiplying section 28f disposed under the photocathode 28b and including a plurality (13 pieces in this embodiment) of plate-like dynodes 28c which are stacked via insulating members 28d, 28d secured by pins 28e, 28e. The dynodes 28c are respectively constituted by a conductive plate provided with a plurality of sections cut in a U-shape and bent to form a blind-like shape. A shield electrode 28g is secured by the pins 28e, 28e under the multiplying section 28f via the insulating members 28d, 28d, and an anode 28h is disposed inside of the shield electrode 28g. These electrodes are electrically connected in a one-to-one relation with terminals of a terminal group 28i disposed at the side end of the body 28A. The shield electrode 28g need not necessarily be provided.

Figure 4:
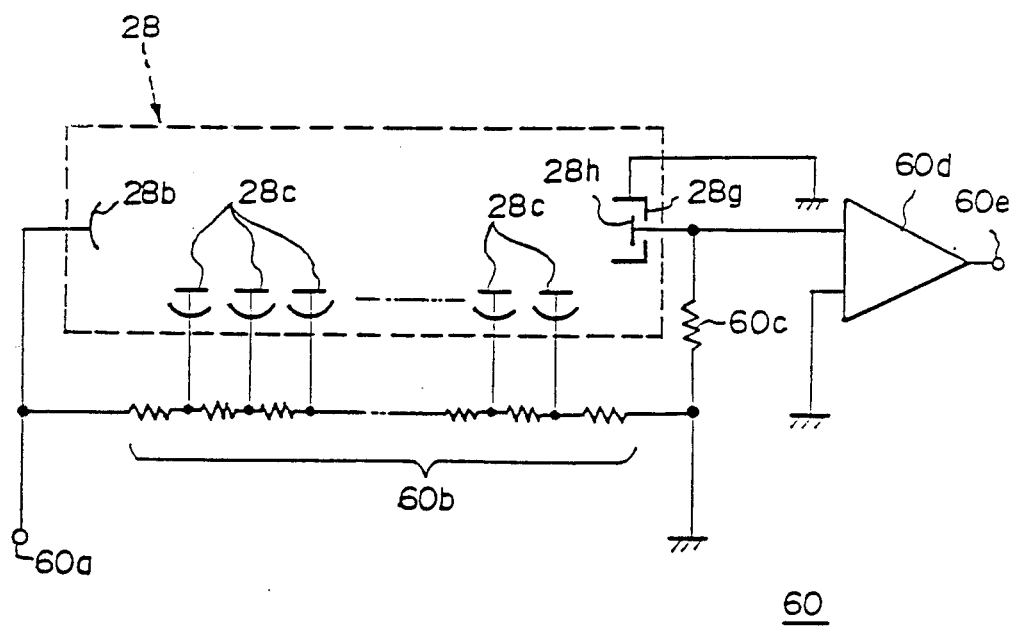
FIG. 4 is a circuit diagram showing the drive circuit for the photomultiplier shown in FIG. 3A.

FIG. 4 shows an electric circuit 60 for operating the photomultiplier 28 and obtaining a photoelectric output. In FIG. 4, similar elements are numbered with the same reference numerals with respect to FIG. 3A. A high negative voltage is applied to the photocathode 28b via a high negative voltage applying terminal 60a. The high negative voltage applied to the high negative voltage applying terminal 60a is divided by a bleeder resistance group 60b into voltages which are applied respectively to the dynodes 28c. The shield electrode 28g is grounded, and the anode 28h is grounded via a resistor 60c and is connected with one of the terminals of an amplifier 60d. The other terminal of the amplifier 60d is grounded. The photoelectrically converted image information is obtained as electric signals from an output terminal 60e of the amplifier 60d. The electric signals thus obtained are subjected to the required image processing, and then sent to a display device such as a CRT or an image reproducing apparatus such as a recording apparatus for carrying out light beam scanning recording on a photosensitive film. By way of example, as shown in FIG. 1, a control circuit section 3 housing printed circuit boards or the like for controlling image processing or the like is provided inward of the loop of the recording belt 1.

The portion of the recording belt 1 on which the image read-out has been finished is moved by the first roller section 40 and the second roller section 50 to an erasing section 30. The erasing section 30 comprises a case 31, and a plurality of (by way of example, three) erasing light sources 32, 32, . . . constituted by fluorescent lamps or the like and disposed in the case 31. The erasing light sources 32, 32, . . . mainly produce erasing light having a wavelength within the stimulation wavelength range of the stimulable phosphor layer of the recording belt 1. The erasing light is irradiated to the overall image forming region of the recording belt 1 while the recording belt 1 is being conveyed, thereby to release radiation energy remaining on the stimulable phosphor layer of the recording belt 1 after the image read-out is finished. A lead plate 2 for blocking the radiation is provided below the image recording table 14 so that the radiation produced by the radiation source 11 at the time of the image recording does not adversely affect the image read-out section 20, the erasing section 30, and the recording belt 1 positioned therein. Also, in this embodiment, the image read-out and the erasing are carried out on a single image forming region simultaneously for a predetermined period. The recording belt portion on which the erasing has been finished at the erasing section 30 is conveyed to the image recording section 10 for reuse in image recording.

With this embodiment wherein the distance between the two roller sections is adjusted to be approximately equal to the length of the maximum single image area, the image recording section 10 is disposed above the recording belt 1, and the image read-out section 20 and the erasing section 30 are disposed below the recording belt 1, the length of the overall apparatus in the horizontal direction can be decreased to a value approximately equal to the length of the above-mentioned single image area, and the recording and read-out apparatus which has heretofore been large can be made markedly small. Also, scanning by the stimulating rays 21A in the main scanning direction is carried out on the circumferential surface of the roller 42 which conveys the recording belt 1. Therefore, movement of the recording belt 1 at the scanning position is very stable, and the scanning for image read-out can be carried out accurately.

The stimulable phosphor layer need not necessarily be formed over the overall surface of the recording belt 1, and one or a plurality of the stimulable phosphor layers each extending over a single image area may be formed at a part of the recording belt 1. Also, the first roller section 40 and the second roller section 50 may each be constituted by a single roller or by three or more rollers. Further, the distance L between the two sets of roller sections may be made longer than that of this embodiment if it is not more than 1.5 times as long as the length of the maximum image size recordable in the apparatus. The configurations of the other parts of the apparatus are not limited to those as described in the aforesaid embodiment.

Figure 5:
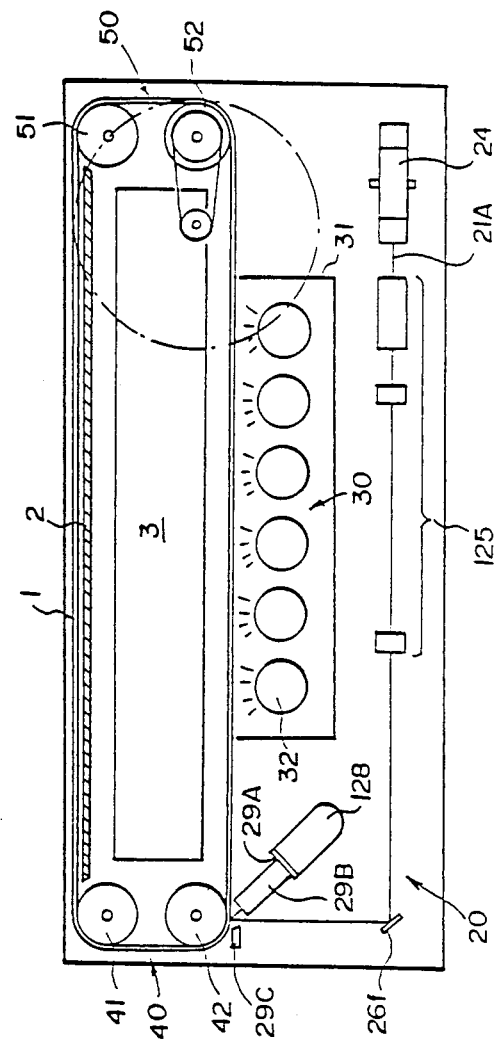
FIG. 5 is a side view showing another embodiment of the radiation image recording and read-out apparatus in accordance with the present invention.

Another embodiment of the radiation image recording and read-out apparatus in accordance with the present invention will hereinbelow be described with reference to FIG. 5 and those that follow. In FIG. 5, similar elements are numbered with the same reference numerals with respect to FIG. 1.

Figure 6:
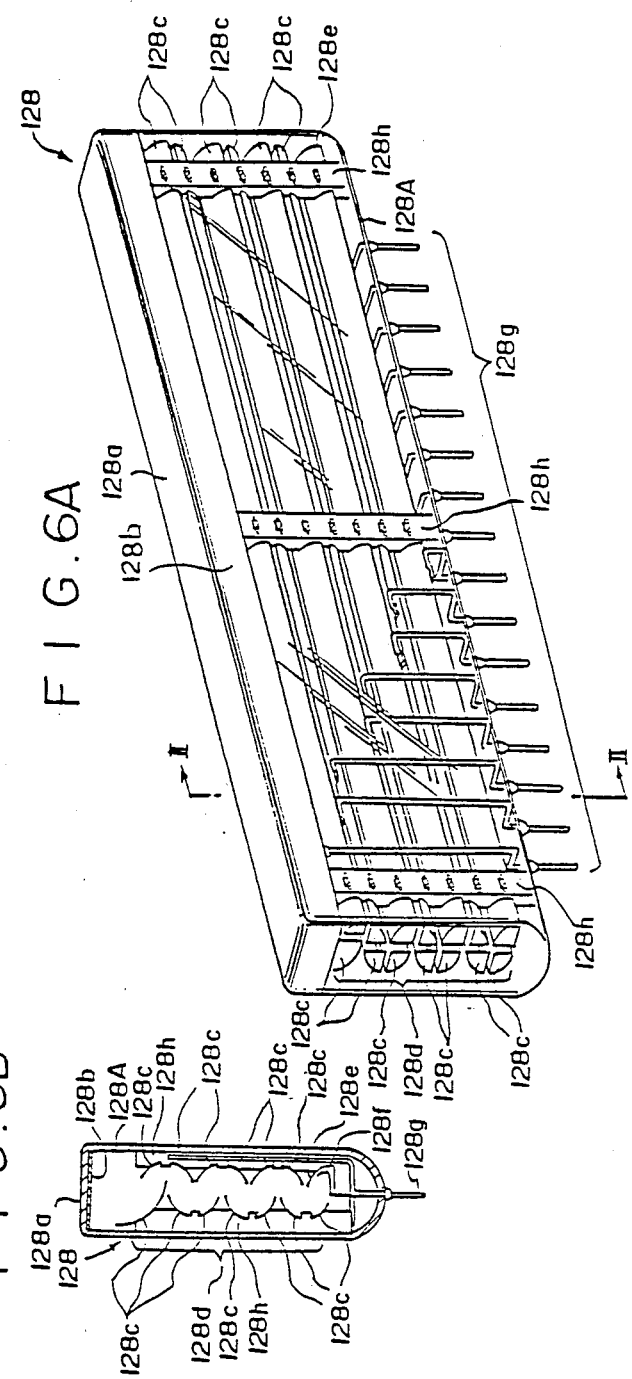
FIG. 6A is a perspective view showing a box type photomultiplier.
FIG. 6B is a sectional view taken along line II—II of FIG. 6A.

With reference to FIG. 5, the erasing section 30 is disposed at the center below the recording belt 1, and the optical elements of the image read-out section 20 such as the rotating polygon mirror 24, a lens system 125 and a reflection mirror 26f for guiding the stimulating rays 21A to the scanning position are disposed under the erasing section 30. Also, a long photomultiplier 128 at the image read-out section 20 has an electrode configuration generally called the box type. FIGS. 6A and 6B show the box type photomultiplier 128.

The photomultiplier 128 comprises a vacuum body 128A, a photocathode (photoelectric face) 128b disposed to face a long light receiving face 128a for producing photoelectrons in the vacuum body 128A, and a multiplying section 128d disposed under the photocathode 128b in the vacuum body 128A and including a plurality of electrodes (dynodes) 128c, 128c, ... having a quarter cylinder shape and exhibiting the secondary electron emission effect. A shield electrode 128e is disposed to face the lowermost dynode 128c of the multiplying section 128d, and an anode 128f for collecting the electron streams multiplied by the multiplying section 128d and generating a signal is positioned inside of the shield electrode 128e. These electrodes are respectively connected electrically in a one-to-one relation with terminals of a terminal group 128g disposed on the side opposite to the light receiving face 128a in a number equal to the number of the electrodes. The dynodes 128c, 128c, ... and the shield electrode 128e are secured inside of the body 128A by supporting members 128h, 128h, 128h fabricated of an insulating material. For obtaining the photoelectric output from the photomultiplier 128, the circuit as shown in FIG. 4 may be used. In the box type photomultiplier 128, the shield electrode 128e need not necessarily be provided. The long photomultiplier used in the present invention may also be fabricated by extending a photomultiplier provided with a multiplying section comprising other known electrode or electrodes.

Figure 7:
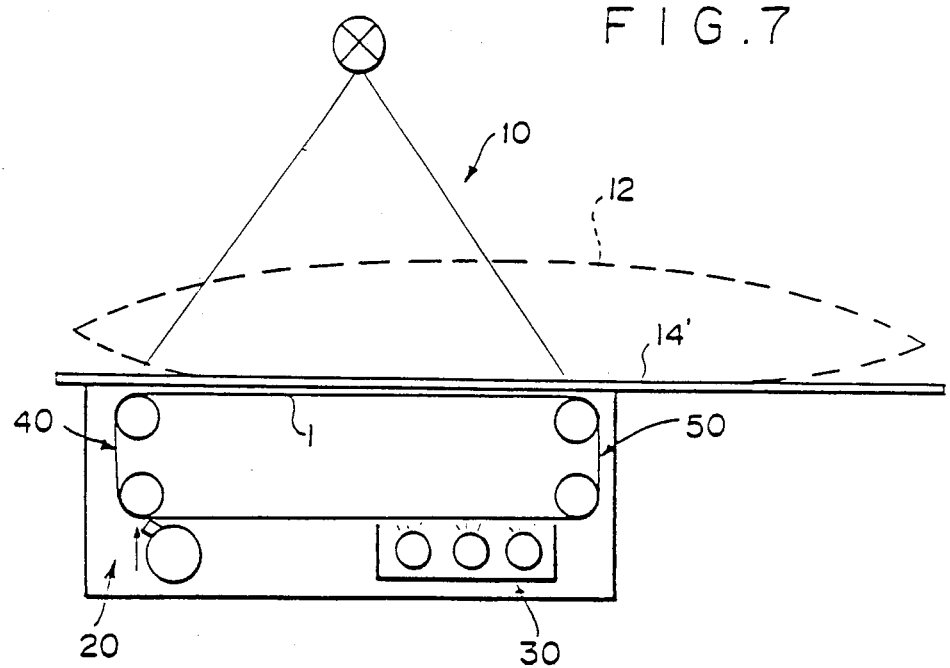
FIG. 7 is a schematic view showing an example of configuration of the housing.
Figure 8:
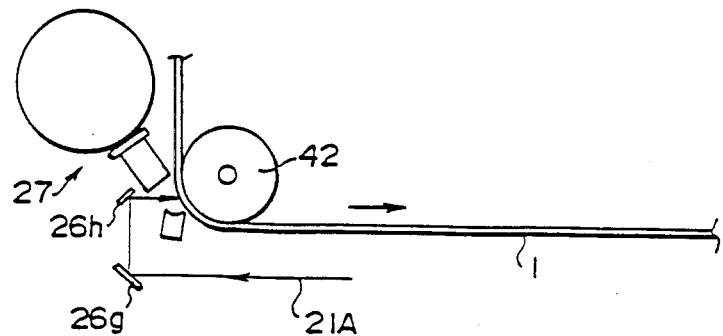
FIG. 8 is a schematic view showing an example of a layout of the image read-out section.
Figure 10:
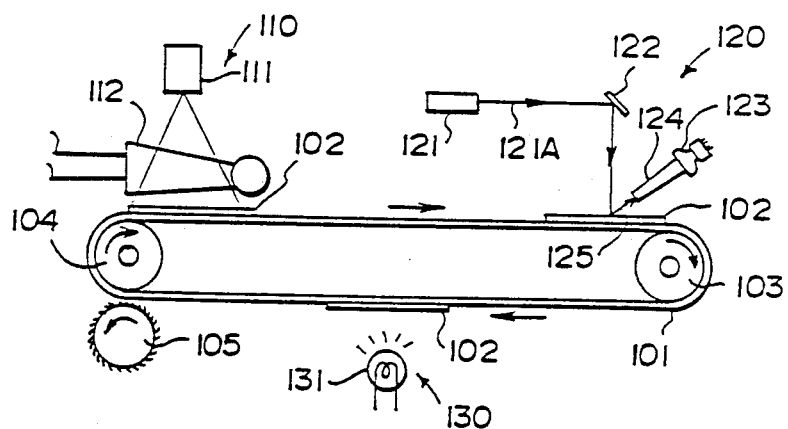
FIG. 10 is a side view showing a conventional radiation image recording and read-out apparatus.

A housing of the apparatus, which contains the recording belt 1, the image read-out section 20, the erasing section 30 and the like, is not necessarily of the minimal size which can contain these parts, but can be formed into an arbitrary size. For example, as shown in FIG. 7, the image recording table 14' on the upper surface of the housing may be projected horizontally to support the object 12 favorably. Also, all the parts of the image read-out section need not necessarily be provided on the side facing the radiation source via the recording belt. By way of example, as shown in FIG. 8, the scanning position may be disposed in an approximately horizontal relation to the roller 42, and some elements of the image read-out section such as optical path adjusting mirrors 26g and 26h and the photoelectric read-out means 27 may be disposed in an approximately horizontal relation to the recording belt 1.

Figure 9:
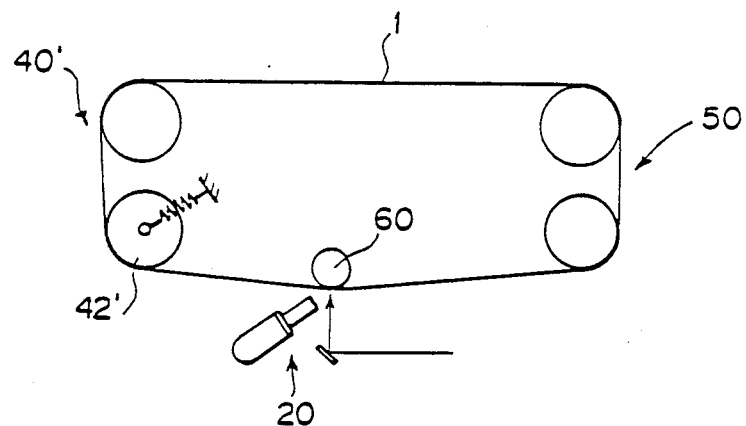
FIG. 9 is a schematic view showing an example of structure of the group of rollers.

Further, as shown in FIG. 9, the group of rollers may be composed of two sets of roller sections 40' and 50, and other additional rollers (roller 60 in FIG. 9). In this case, scanning by the stimulating rays at the image read-out section can be conducted on any rollers, for example, on the roller 60 as shown in this FIG. However, when the group of rollers include a tension roller (roller 42' in the first roller section in FIG. 9), the scanning position should be set on the rest of rollers.

As the photoelectric read-out means, the means provided with the long photomultiplier as mentioned above should preferably be used for making the apparatus small. However, it is also possible to use a known photoelectric read-out means comprising a light guide member having a light input end face extending along the main scanning line and a cylindrical light output end face, and a comparatively small photomultiplier closely contacted with the light output end face of the light guide member.

I claim:

1. A radiation image recording and read-out apparatus comprising:
   (i) a recording belt composed of an endless belt provided with a stimulable phosphor layer,
   (ii) a group of rollers, around which said recording belt is applied, including two sets of roller sections spaced apart from each other by a predetermined distance, for conveying and circulating said recording belt between said two sets of roller sections along the direction of said predetermined distance,
   (iii) an image recording section for exposing said stimulable phosphor layer to a radiation passing through an object to have a radiation image of the object stored on said stimulable phosphor layer,
   (iv) an image read-out section provided with a stimulating ray source for emitting stimulating rays for scanning said stimulable phosphor layer carrying said radiation image stored thereon, and a photoelectric read-out means for obtaining electric image signals by reading out light emitted by said stimulable phosphor layer in proportion to the stored radiation energy when said stimulable phosphor layer is scanned and stimulated with the stimulating rays, and
   (v) an erasing section for eliminating radiation energy remaining on said stimulable phosphor layer prior to image recording on said stimulable phosphor layer after a radiation image is read out therefrom at said image read-out section,
   wherein the improvement comprises:
   (a) said predetermined distance between said two sets of the roller sections is 1-1.5 times as long as the length of the maximum single image area of the radiation image which can be recorded at said image recording section,
   (b) said image recording section faces said recording belt moving between said two sets of the roller sections, and
   (c) said image read-out section is positioned such that scanning by said stimulating rays is carried out on a portion of said stimulable phosphor layer present on a circumferential surface of a roller in said group of rollers.

2. An apparatus as defined in claim 1 wherein said photoelectric read-out means at said image read-out section comprises a long photomultiplier having a light receiving face extending along a scanning line by said stimulating rays, said long photomultiplier being disposed close to said recording belt.

* * * * *